Aug. 29, 1950   N. R. IRRER   2,520,722
LOG GRAPPLE
Filed Aug. 4, 1948

Inventor
NORMAN R. IRRER
By Dean Lawrence
Attorney

Patented Aug. 29, 1950

2,520,722

UNITED STATES PATENT OFFICE 2,520,722

LOG GRAPPLE

Norman R. Irrer, St. Johns, Mich.

Application August 4, 1948, Serial No. 42,519

3 Claims. (Cl. 214—65.3)

This invention relates in general to a grapple and more particularly to a type thereof easily mountable upon the rear end of a tractor for engaging a log.

The conventional method for moving a large log where a tractor is available is to encircle the log with a chain, which chain is then hitched to the tractor. When a log is moved by this method, the tractor operator must dismount from the tractor, manually raise the log in order to encircle it with the chain, hitch the chain to the tractor, and then climb back upon the tractor. Such a method is slow and arduous.

Often, when the log is large in diameter, it is virtually impossible for one man to place the chain around the log without exposing himself to a physical strain. Furthermore, that portion of the chain between the log and the ground considerably impedes the movement of the tractor when the log is dragged.

Many tractors, such as the Ford-Ferguson type, are equipped with hydraulic lift mechanisms which are designed to sustain a maximum load at certain points. Consequently, traction implements are preferably especially designed for such tractors to utilize these maximum load points.

Therefore, a need becomes apparent for a means, particularly adaptable to a tractor having a hydraulic lift mechanism, for quickly and positively engaging a log without necessitating the dismounting of the tractor operator.

Accordingly, a primary object of this invention is to provide a log engaging device which is easily and quickly attachable to the rear end of a tractor, especially one having a lift mechanism, for securely engaging a log which can then be moved by the tractor.

A further object of this invention is to provide a device, as aforesaid, which can be conveniently and effectively manipulated from the driver's seat of the tractor by the tractor operator.

Other objects and purposes of this invention will become apparent to persons familiar with this type of equipment upon referring to the accompanying drawings and upon reading the following specification.

In meeting those objects and purposes heretofore mentioned, as well as others incidental thereto and associated therewith, I have provided a pair of barbed tongs which are loosely supported at their pivot point within a ring. A pair of hitching arms are secured to and extend substantially radially from said ring at diametrically opposed points thereon. The legs of the tongs, one of which is provided with a handle, are curved away from each other on one side of their pivot point.

For illustrations of a particular preferred embodiment of my invention, attention is directed to the accompanying drawings in which.

Figure 1:
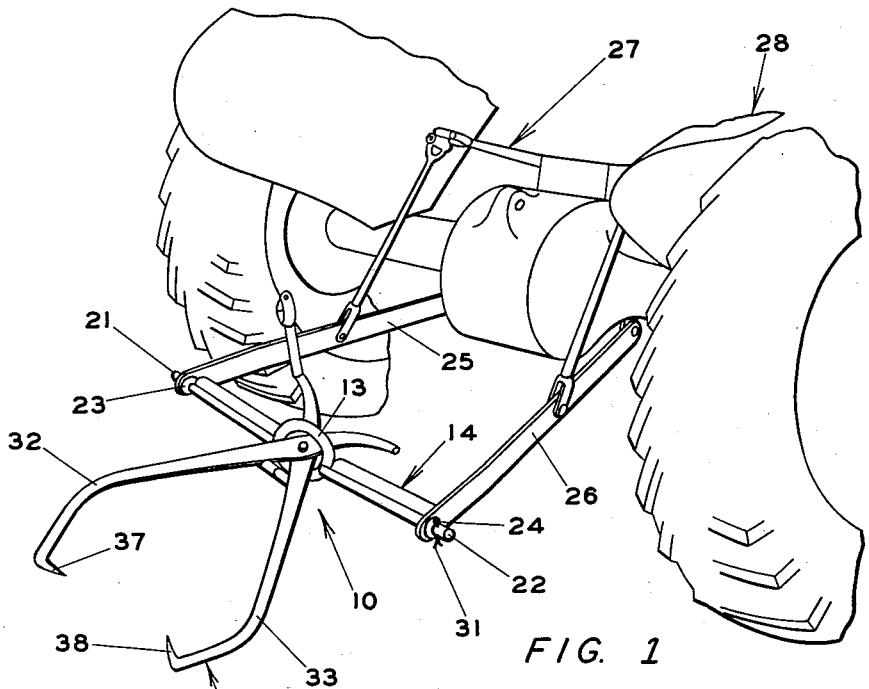
Figure 1 is an oblique, fragmentary view of the rear end of a tractor with the log grapple to which this invention relates operably attached thereto.
Figure 2:
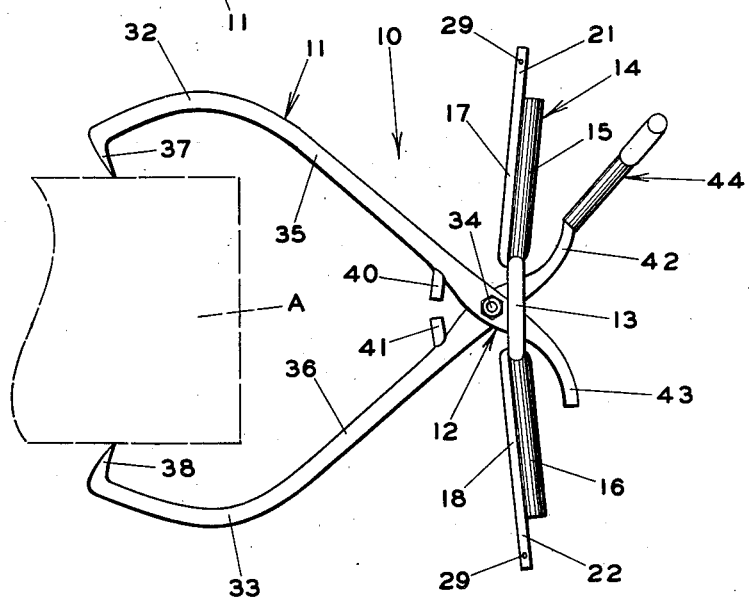
Figure 2 is a plan view of said grapple.

The log grapple 10 (Figures 1 and 2) is comprised of a pair of tongs 11 which are removably supported near their pivot point 12 within the locking ring 13 which is preferably at the center of the draw bar 14.

The draw bar 14 is comprised of said locking ring 13 and a pair of substantially co-axial draw arms 15 and 16 which are secured, as by welding, at one end of each to said locking ring 13 at diametrically opposite points thereon so that said draw arms extend away from the locking ring 13 radially in approximately opposite directions.

A pair of hitching rods 17 and 18, which are parallel with and secured to the draw arms 15 and 16, respectively, extend substantially beyond those ends of the draw arms 15 and 16 remote from the locking ring 13. The hitching rod extended ends 21 and 22 of the hitching rods 17 and 18, respectively, are preferably of such length that they are engageable with the ball and socket joints 23 and 24 (Figure 1) near the free ends of the lift arms 25 and 26, respectively, of a conventional hydraulic lift mechanism 27 supported upon the rear of a tractor 28. Suitable cotter pin openings 29 are provided near the extremities of the brace rod extended ends 21 and 22 for the reception of appropriate cotter pins 31 (Figure 1) therethrough.

The tongs 11 have a pair of legs 32 and 33 which are pivoted at said point 12 by means of the pivot bolt 34. The legs 32 and 33 are pivoted substantially closer to one end than to the other end of each. The longer portions of the legs 32 and 33, hereinafter referred to as the gripping portions 35 and 36, respectively, are curved toward each other near their free extremities, which extremities are provided with barbs 37 and 38, respectively. A pair of stops 40 and 41 are secured to the leg gripping portions 35 and 36, respectively, adjacent to the pivot point 12. The stops 40 and 41, which may be made of metal, prevent the leg gripping portions 35 and 36 from approaching each other beyond a certain predetermined position.

The leg short portions, hereinafter referred to as the leg locking portions 42 and 43 of the legs 32 and 33, respectively, curve away from each other to such an extent that it is impossible to pull them through the ring 13 when the legs 32 and 33 are being held together in operable position by means of the pivot bolt 34. A handle 44 is secured, as by welding, to a free end of one of the leg locking portions, here the leg locking portion 42.

It will be understood that although the log grapple 10 is herein disclosed for operation with a tractor, such as the Ford-Ferguson type, having a hydraulic lift mechanism, the said grapple may be used with any type of tractor equipped with means for engaging a standard draw bar of the type used with a lift mechanism.

The log grapple 10 is attached to the rear end of a tractor 28 so that the draw bar 14 is preferably permitted to rotate about its longitudinal axis. The tractor is then backed up to the log A (Figure 2) to be engaged by the tongs 11 and the operator maneuvers the barbs 37 and 38 into engagement with the said log by means of the handle 44, which he can reach while he is sitting in the driver's seat of the tractor. As the tractor is caused to move forwardly, away from the log, the locking ring 13 slides along the outwardly curved locking portions 42 and 43 thereby urging the locking portions toward each other. Movement of the leg locking portions 42 and 43 toward each other causes the leg gripping portions 35 and 36 to move toward each other a corresponding distance, thus imbedding the barbs 37 and 38 into the log A.

The heavier the log is, or the harder it is to move, the further the locking ring 13 will be urged along the locking portions and the deeper the barbs 37 and 38 will be urged to imbed themselves into said log A. Thus, as long as the log grapple 10 is being drawn by the tractor, the barbs 37 and 38 will positively engage the log A through the action of the gripping ring 13 upon the leg locking portions 42 and 43.

A log may be released from the grip of said grapple by moving the tractor toward the log until the tongs 11 are loose within the gripping ring 13, and by shaking the tongs 11 until the barbs 37 and 38 become disengaged from said log.

Although the above-mentioned drawings and description apply to one particular preferred embodiment of the invention, it is not my intention, implied or otherwise, to eliminate other variations or modifications which do not depart from the scope of the invention, unless specifically stated to the contrary in the appended claims.

I claim:

1. In a log grapple for removable support upon the rear of a tractor having a tool lift mechanism, the combination comprising: a draw bar comprised of a locking ring, a pair of substantially coaxial draw bar arms secured to diametrically opposite points on said locking ring and extending radially therefrom in opposite directions, and a pair of hitching rods parallel with and secured to said draw arms, said rods extending beyond those ends of said draw arms remote from said ring for engaging said tool lift mechanism; a pair of tongs comprised of a pair of legs pivotally secured to each other at a point, said tongs being loosely supported within said ring at about the pivot point thereof, and said legs having gripping portions on one side of said pivot point which curve toward each other and are terminated with integral points extending toward each other, and said legs having locking portions on the other side of said pivot point which curve away from each other whereby movement of said ring away from said pivot point along said locking portions urges said gripping portions toward each other; stop means secured to the opposed surfaces of said leg gripping portions near to said pivot point limiting the movement of said leg gripping portions toward each other; and a handle secured to one of said leg locking portions.

2. In a log grapple for removable support upon the rear of a tractor, the combination comprising: a draw bar comprised of a substantially circular locking ring and a pair of hitching arms secured to diametrically opposite sides of said locking ring and extending radially therefrom in opposite directions for engagement with said tractor; a pair of tongs having a pair of legs pivotally secured to each other at a point, said tongs being loosely supported within said ring near the pivot point thereof, and said legs having gripping portions on one side of said pivot point curving toward each other and having locking portions on the other side of said pivot point curving away from each other, whereby movement of said ring along said locking portions urges said gripping portions toward each other; means limiting the movement of said gripping portions toward each other; and a handle secured to one of said leg locking portions.

3. A log grapple comprising: a draw bar having a substantially circular locking ring and a pair of hitching arms secured to diametrically opposite sides of said ring and extending radially therefrom in opposite directions; a pair of tongs having a pair of legs pivotally secured to each other at a point, said tongs being loosely supported within said ring near the pivot point thereof; means adjacent said pivot point for limiting the diverging movement of said legs with respect to each other; and a handle secured to one of said legs.

NORMAN R. IRRER.

REFERENCES CITED

The following references are of record in the file of this patent:

UNITED STATES PATENTS

| Number | Name | Date |
|---|---|---|
| 2,247,098 | Pearse | June 24, 1941 |
| 2,375,205 | Barras | May 8, 1945 |
| 2,379,797 | Gilbert | July 3, 1945 |
| 2,402,352 | Taylor | June 18, 1946 |
| 2,407,993 | McKee | Sept. 24, 1946 |

FOREIGN PATENTS

| Number | Country | Date |
|---|---|---|
| 17,809 | Sweden | July 2, 1904 |